United States Patent [19]
Linden

[11] Patent Number: 4,795,862
[45] Date of Patent: Jan. 3, 1989

[54] METHOD AND APPARATUS FOR OPERATING VEHICLE WINDOWS WITH A SWITCH

[75] Inventor: Gerald E. Linden, Tolland, Conn.

[73] Assignee: United Technologies Automotive, Inc., Dearborn, Mich.

[21] Appl. No.: 157,105

[22] Filed: Feb. 10, 1988

Related U.S. Application Data

[63] Continuation of Ser. No. 941,905, Dec. 12, 1986, abandoned.

[51] Int. Cl.[4] ........................ H01H 25/04; H02P 1/00

[52] U.S. Cl. .................................. 200/6 A; 200/5 R; 318/236; 318/280

[58] Field of Search .................. 200/1 R, 1 V, 4, 5 R, 200/6 R, 6 A, 17 R, 18, 153 K; 307/10 R, 114; 318/256, 280, 281–286

[56] References Cited

U.S. PATENT DOCUMENTS

| | | | |
|---|---|---|---|
| 2,849,548 | 8/1958 | Young | 200/6 A |
| 3,126,507 | 3/1964 | Cleminshaw | 318/293 |
| 3,400,232 | 9/1968 | Mathey | 200/18 |
| 3,629,606 | 12/1971 | Mathey | 307/114 |
| 3,715,933 | 2/1973 | Robinson | 74/471 XY |
| 3,835,270 | 9/1974 | Dufresne | 200/6 A |
| 3,927,285 | 12/1975 | Frost et al. | 200/6 A |
| 4,115,670 | 9/1978 | Chandler | 200/5 R |
| 4,245,137 | 1/1981 | Hirai | 200/4 |
| 4,330,694 | 5/1982 | Ogawa | 200/6 A |
| 4,348,556 | 9/1982 | Gettig et al. | 200/5 R |
| 4,415,782 | 11/1983 | Elmberg | 200/6 A |
| 4,473,725 | 9/1984 | Kim | 200/6 A |
| 4,479,038 | 10/1984 | Marhold et al. | 200/6 A |

*Primary Examiner*—J. R. Scott

[57] ABSTRACT

A method of operating "left" and "right" electric windows in a vehicle is described. A switch has an actuator manipulable, as by pivoting, from a neutral position to respective ones of a "left front", a "right front", a "left rear" and a "right rear" position, relative to the mounting of the switch in the vehicle. The various actuator positions effect the following responses from the windows:

"Left front"="left" window "up"
"Left rear"="left" window "down"
"Right front"="right" window "up"
"Right rear"="right" window "down".

The switch actuator may also be movable directly to a "front" position which drives both the "left" and "right" windows "up", or to a "back" position which drives both windows "down". Further, manipulation of the actuator in another plane may be used to switch between "front" and "rear" window control.

12 Claims, 2 Drawing Sheets

FIG. 1
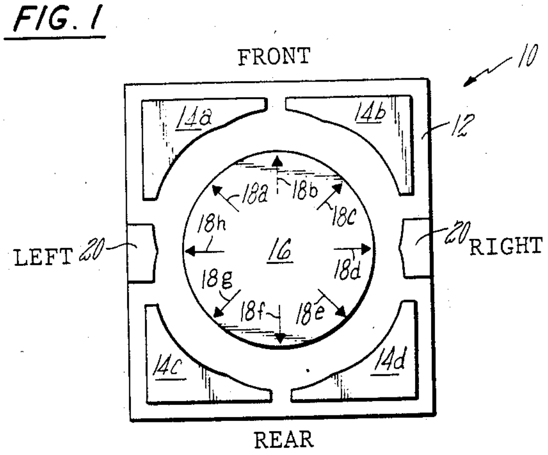
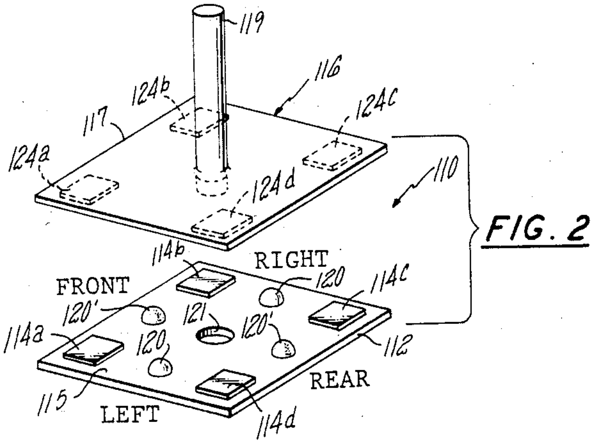
FIG. 2
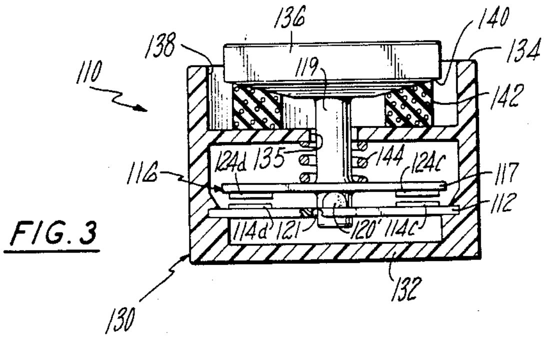
FIG. 3

METHOD AND APPARATUS FOR OPERATING VEHICLE WINDOWS WITH A SWITCH

RELATED APPLICATIONS

This application is a continuation of U.S. patent application Ser. No. 06/941,905, filed Dec. 12, 1986, now abandoned.

TECHNICAL FIELD

The invention relates to electrical switches and, more particularly, to a switch resembling a joystick-type switch and capable of operating two or more devices.

BACKGROUND OF THE INVENTION

Many modern automobiles are equipped with electric windows. Typically, one bidirectional switch is dedicated to each window and is moved in one direction to raise the window and in the opposite direction to lower the window. Four windows require four such switches, which are sometimes arranged in a logical square pattern. Each corner of the square relates to a corresponding corner of the car. Sometimes the four switches are arranged linearly, for instance, on the driver's armrest. The logic of this arrangement is somewhat attenuated and one may fumble for the correct switch. Either arrangement is both consumptive of space and high in parts count.

A joystick-type switch is disclosed in U.S. Pat. Nos. 3,400,232 and 3,629,606, both issued to C. J. Mathey. In Mathey's switch, four contacts are arranged along the four walls of a square switch enclosure. Each of the four contacts controls one of four windows in one direction, such as "up". Thus, by manipulating the "wand" of the switch towards one of the walls of the switch, a particular window may be actuated in a particular direction. A secondary switch is actuated by an axial movement of the wand so that concomitant manipulation of the wand towards one of the four walls of the switch causes motion in an opposite direction for the particular window. Additionally, a camming arrangement is disclosed whereby all four windows can be simultaneously activated in one direction or the other.

A joystick-type switch is disclosed in U.S. Pat. No. 3,126,507 issued to D. R. Cleminshaw. Cleminshaw's switch has a cross-shaped actuator with the two members of the actuator carrying voltage of opposite polarity and having two contacts arranged at each corner of a square switch housing. Cleminshaw's switch is useful for two-axis control of a device, such as a spotlight or a mirror. By moving the switch actuator towards a wall of the switch, the device is moved in one direction, or axis, by one motor, by moving the actuator towards the opposite wall of the switch, the device is moved in the opposite direction. By moving the actuator towards a corner of the switch, the device is moved in a mixed direction between the two axes by the two motors.

Cleminshaw's switch is exemplary of a typical joystick-type switch in that movement of the actuator or joystick in an "orthogonal direction", i.e., towards a wall of the switch causes a reaction in a single controlled device in a corresponding orthogonal axis, and movement of the actuator in an "angular direction", i.e., towards a corner of the switch, causes a reaction in the single controlled device between and bisecting its orthogonal axes or degrees of freedom.

DISCLOSURE OF THE INVENTION

It is a principal object of the invention to provide an ergonomically optimized method for controlling electric windows. It is a further object to provide apparatus to facilitate practice of the method.

According to the invention, a single joystick-type switch is used to control two devices, such as two electric car windows, in either of two, typically opposite, directions.

An embodiment of the switch includes a housing adapted for conventional horizontal mounting in a predetermined orientation in a vehicle, as on an armrest or a center console. The switch includes contacts each positioned relatively toward a respective one of the four "corners" of the vehicle. A square or similar rectangularly-shaped switch housing has a contact disposed at each corner thereof and is adapted for mounting with each corner oriented toward a respective corner of the vehicle. The corners are designated "left front" and "right front", "left rear" and "right rear". Movement of an actuator within the housing towards a corner of the switch causes the closure of the corresponding contact and motion of a particular window in a particular direction. For instance, movement of the actuator towards the "left front" corner of the switch causes the "left" window to go "up", movement of the actuator towards the "left rear" corner of the switch causes the "left rear" contact to close and the "left" window to go "down", movement of the actuator towards the "right front" corner of the switches causes the "right front" contact to close and the "right" window to go "up", and movement of the actuator towards the "right rear" corner of the switch causes the "right rear" contact to close and the "right" window to go "down". Movement of the actuator directly towards the "front" of the switch causes both the "left front" and "right front" contacts to close and both the "left" and "right" windows to go "up", and movement of the actuator directly towards the "rear" of the switch causes both the "left rear" and "right rear" contacts to close and both the "rear" window to go down.

It should be understood that the terms "left", "right", "front", "rear", and combinations thereof e.g., "left front", are useful in describing the operation of the switch of this invention in an automobile environment wherein "foont" would mean towards the front of the car, "left" would mean towards the driver's left as he sits in the car, "right" would means towards the driver's right and "rear" would mean toward the rear of the car.

In the preceeding paragraphs a novel apparatus is described for a novel method of controlling electric car windows and the like. Insofar as the novel method is concerned, the joystick-type switch of the present invention is quite distinct from the typical joystick-type switch. More particularly, in a conventional switch, fore and aft "orthogonal" motion of the actuator controls a single device in one axis and side-to-side "orthogonal" motion of the actuator controls the single device in another, orthogonal axis for example see Cleminshaw. "Cornerwise" or "angular" motion of that actuator controls the single device in two axes at once, and thus provides mixed motion.

By contrast, the joystick-type switch of this invention controls two devices, each in one of two typically opposite directions by "cornerwise" motion of the actuator relative to the mounted orientation of the switch, and provides control over both devices in a single direction by direct fore and aft movement of the actuator. The concept of "mixed motion" is inapplicable because any single device is capable of only a single degree of freedom with respect to its driven motion.

It should be understood that side-to-side movement of the actuator of this invention is inapplicable to its use in window control, per se. Imagine, for instance, movement of the actuator to the "left", which would close both the "left front" and "left rear" contacts. The "left" window cannot go "up" and "down" simultaneously. Therefore, according to an aspect of the invention, the actuator is restrained from direct "left" or "right" motion.

BRIEF DESCRIPTION OF THE DRAWINGS

FIG. 1 is a highly diagrammatic representation, in plan view, of the methodology and structure of the switch arrangement of the invention;

FIG. 2 is an exploded, diagrammatic representation of part of a switch according to one embodiment of the invention;

FIG. 3 is a diagrammatic sectional view illustrating the switch of FIG. 2 more completely;

BEST MODE FOR CARRYING OUT THE INVENTION

Figure 4:
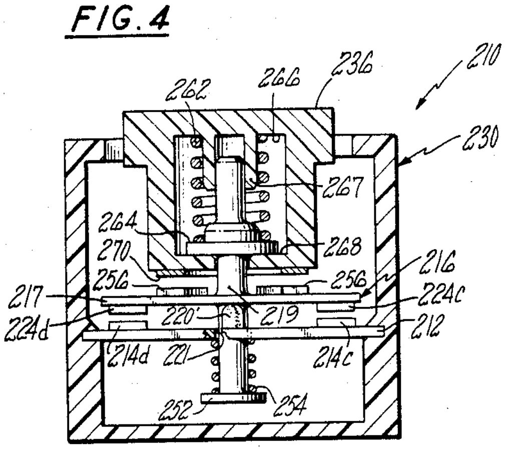
FIG. 4 is a diagrammatic sectional view of another embodiment of the switch in accordance with the invention.

Referring to FIG. 1, there is provided a diagrammatic representation of the apparatus and methodology of the switch 10 of this invention as operatively positioned in a vehicle. A stationary member 12 of the switch 10 may be a square wafer made of a suitable insulating material, such as plastic. At each corner of the wafer 12 is a conductive contact or land 14*a*, 14*b*, 14*c*, and 14*d*, at the "left front", "right front", "left rear" and "right rear" corners of the wafer, respectively. These designations are intended to correspond with the presumption that the switch is, or is adapted to be, mounted in a vehicle such that member 12 is substantially horizontal and oriented "front-to-rear" and "left-to-right" as depicted in FIG. 1.

A movable member or actuator 16 of the switch 10 is disposed between the lands, as shown. The actuator 16 is shown in its neutral position and is here depicted as a disc-like conductive member spaced, in its neutral position, equidistant from all four lands. The actuator is, at least theoretically, movable from its neutral position towards the "left front" of the wafer 12, towards the "front" of the wafer 12, towards the "right front" of the wafer 12, towards the "right" of the wafer 12, towards the "right rear" of the wafer 12, towards the "rear" of the wafer 12, towards the "left rear" of the wafer 12, and towards the "left" of the wafer 12, as indicated by the arrows 18*a*, 18*b*, 18*c*, 18*d*, 18*e*, 18*f*, 18*g*, and 18*h*, respectively.

The switch arrangement of the invention is intended for use in controlling at least two separate devices, each being movable in opposite directions by a respective bidirectional motor. Specifically, the switch arrangement is intended for moving "left" and "right" windows (not shown) "up" and "down" via respective motors (not shown in FIG. 1).

When the actuator 16 is moved towards the "left front" of the wafer, a circuit is completed between the actuator and the land 14*a* and a "left" window would be caused to move "up".

When the actuator 16 is moved towards the "left rear" of the wafer, a circuit is completed between the actuator and the land 14*c* and the "left" window would be caused to move "down".

When the actuator 16 is moved towards the "right front" of the wafer, a circuit is completed between the actuator and the land 14*b* and a "right" window would be caused to move "up".

When the actuator 16 is moved towards the "right rear" of the wafer, a circuit is completed between the actuator and the land 14*d* and the "right" window would be caused to move "down".

When the actuator 16 is moved directly towards the "front" of the wafer, a circuit is completed between the actuator and both of the lands 14*a* and 14*b*, and both the "left" and "right" windows would be caused to move "up".

When the actuator 16 is moved directly towards the "rear" of the wafer, a circuit is completed between the actuator and both of the lands 14*c* and 14*d*, and both the "left" and "right" windows would be caused to move "down".

Moving the actuator directly towards the "left" or "right" of the wafer is somewhat meaningless in the aforementioned context of window control. Thus, stops or barriers 20 are provided on the wafer 12 directly to the "left" and "right" of the actuator 16, sufficiently spaced therefrom so as not to interfere with the intended motions 18*a*, 18*b*, 18*c*, 18*e*, 18*f*, and 18*g* of the actuator while preventing the actuator from contacting the lands 14*a* and 14*c* or 14*b* and 14*d* simultaneously.

Table 1 presents a tabulation of actuator movement and resultant window motion and is applicable to either "front" or "rear" windows.

TABLE 1

| Actuator Movement | Window Motion |
|---|---|
| Front/Left | Raise Left Window |
| Rear/Left | Lower Left Window |
| Front/Right | Raise Right Window |
| Rear/Right | Lower Right Window |
| FRONT | Raise Right & Left Windows |
| REAR | Lower Right & Left Windows |

FIG. 1 is basically representative of the method of this invention and is somewhat atypical of how the switch would actually be constructed. Nevertheless, it would be well within the capabilities of one of ordinary skill in the art to which this invention pertains to implement a switch according to FIG. 1, wherein the actuator is resiliently movable, in-plane, away from its neutral position towards the various contacts or lands.

A more traditional approach, however, is represented in FIG. 2, wherein the essential parts of a switch 110 include an actuator assembly 116 spaced above a stationary wafer 112. Rather than remaining in-plane, the actuator assembly 116 is tiltable or pivotable to effect a contact-closing or switch closing engagement with one of the four conductive lands 114*a*–114*c*. The lands 114*a*–114*c* are positioned in quadrature, preferably at the four corners of wafer 112. This configuration and manner of actuation is more in keeping with the joystick-type approach to switch manipulation. In addition to the conductive lands 114a–114c, the upper surface 115 of wafer 112 also includes several projections or pads 120 and 120'. Specifically, pads 120 may be relatively nonyielding and serve as stops to prevent actuator assembly 116 from simultaneously contacting the left side lands 114a, 114d or the right side lands 114b, 114c. In that respect, they are analogous to stops 20 of FIG. 1. On the other hand, the pair of pads 120' are positioned in quadrature with the pads 120 and are sufficiently yieldable to allow actuator assembly 116 to operatively engage appropriate ones of the lands 114a–114d to provide the control actions described above. Pads 120' serve as resilient standoffs which also aid in centering actuator assembly 116 toward the neutral position and, in that respect, may be given much greater angular extent than has been depicted, including an annular ridge fully encircling the opening 121.

The actuator assembly 116 is movable relative to the wafer 112 and includes another wafer 117 rigidly affixed to a manipulable rod 119. A lower end of the rod 119 extends below the undersurface of wafer 117 for pivotably mounted extension through a hole 121 disposed in the center of the wafer 112. For the purpose of illustration herein, appropriate conductive contact surfaces are provided on the undersurface of wafer 117 for selective electrical contact with the lands 114a–114d on wafer 112. In one instance, that contact surface might be provided by making the entirety of wafer 117, or at least its undersurface, conductive. Alternatively, as illustrated in FIG. 2 for the purpose of presenting a clearer understanding of the invention, the wafer 117 might be provided with four discreet conductive contact areas designated 124a–124d positioned in opposed, facing relation with corresponding contact lands 114a–114d respectively of wafer 112.

FIG. 3 illustrates a sectional view of the switch 110 in its assembled form. The stationary wafer 112 is fixedly mounted inside a housing 130 and is oriented parallel to the base 132 of the housing. Appropriate terminals (not shown) provide electrical connection between the contacts within housing 130 and the circuitry extended thereto. The interior shape of housing 130 preferably conforms to the shape of movable wafer 117. In the present instance, housing 130 is cubical. This allows the requisite tilting or pivoting of actuation assembly 116, but limits rotation of wafer 117 about the axis of rod 119 so as to maintain angular alignment of the contacts on that wafer with those on wafer 112. The upper wall 134 of the housing 130 contains a hole or opening 135 disposed in its center through which the rod 119 extends. An actuator button 136 is rigidly affixed to the upper end of rod 119, as by being in snap-fit engagement therewith or through integral molding therewith. Actuator button 136 is preferably square to emphasize the corner locations to which the actuator assembly 116 may be tilted for individual window control, however, it will be appreciated that other shapes may be used in conjunction with appropriate control indicia. The actuator button 136 is received within a recess 138 in the upper wall 134 in the housing 130 and has a convex lower surface 140. A resilient ring 142, as for instance of rubber, is disposed between the lower surface 140 of the actuator button 136 and the upper surface of the upper wall 134 of housing 130 to maintain the rod 119 in its neutral position and provide a comfortable amount of resistance to manipulation of actuator assembly 116 via button 136. A spring 134 is disposed in compression about the rod 119 between the undersurface of the upper housing wall 134 and the upper surface of the movable wafer 117 to maintain the movable wafer in close, spaced juxtaposition with the stationary wafer 112. It will be appreciated that the resilient pads 120' depicted in FIG. 2 may assist the resilient ring 142 of FIG. 3 in mintaining some spacing between the two wafers 117, 112 when the switch is in its neutral position. The stops 20, 120 of FIGS. 1 and 2, respectively, are not depicted in FIG. 3 and subsequent Figure for the sake of clarity, but they, in fact, are present.

It will be understood that the contact areas 124a–124d are connected electrically in common via a conductive path (not shown) on wafer 117. It will also be understood, not only with respect to the embodiment of FIGS. 2 and 3, but also with respect to further embodiments to be hereinafter described, that suitable conventional means (not shown) may be employed for providing a conductive path between the exterior of the switch 110 and the contact surfaces 124a–124d associated with the actuator assembly 116. Those means might be provided by a conductive wire connected at one end to a terminal in the housing 130 of the switch and at its other end to the movable actuator assembly 116. Such conductive wire would require sufficient length, clearance, and flexibility to permit it to move through the limited range of displacement of the actuator assembly 116. Alternatively, some form of conductive wiper or brush may provide the electrical connection between the actuator assembly 116 and the exterior of the switch. One end of such wiper would be fixed, for example to the actuator assembly 116, and the other end would be adapted to be in continuous, movable, wiping engagement with a contact surface associated with the switch housing 130.

Although the invention is discussed in the context of providing electrical contacts on the moving actuator, it will be evident that one could open or close a circuit by mounting both terminals or contacts of a respective switch pair on the stationary wafer. One contact of the pair would be movable relative to the other, as by a cantilevered leaf spring. Those contacts could then be actuated to a closed or conversely open position by manipulation of an actuator which would not be required to carry conductive contacts. In such instance, all of the conductive electrical structure would be associated with the stationary wafer and there would be no need for providing movable leads or wipers. Further, there might then be less requirement to constrain rotation of the movable wafer about the axis of the rod.

The switches 10, 110, differ from the type of joystick switch employed for electric mirror control in that mirror switches typically have their contact areas disposed "fore" and "aft" and "left" and "right", and are not suitable for mixed motion (i.e., making more than one contact simultaneously).

The methodology of the invention finds embodiment in yet another switch 210 depicted in FIG. 4. Switch 210 is similar to switch 110 of FIGS. 2 and 3, except that a degree of freedom in the vertical plane is provided to the movable actuator assembly 216 to afford selection between control of the front pair of windows and the rear pair of windows in a vehicle. Specifically, the actuator rod 219 extends downwardly through the opening 221 in stationary wafer 212 and terminates in a flange 252. A spring 254 is mounted in compression about the lower end of rod 219 and acts against the upper surface of flange 252 and the undersurface of stationary wafer 212 to urge actuator assembly 216 and its associated contacts 224a–224d toward close, spaced juxtaposition with the contacts lands 214a–214d on wafer 212. The resilient standoff pads 220' mounted on stationary wafer 212 engage the movable wafer 217 to maintain their respective contacts in spaced relation when the switch is not being actuated.

A pair of arcuate conductive contacts 256 are disposed about the rod 219 on the upper surface of the movable wafer 217. An actuator button 236 of either cylindrical or hollow cubical form surrounds the upper end of actuator rod 219. The actuator button 236 is positioned in an opening in the upper end of switch housing 230. The actuator button 236 is urged upward relative to actuator rod 219 by a spring 262 disposed in compression about the upper end of the rod and acting against suitable opposing spring seats. A lower such spring seat is provided by a radial flange 264 on actuator rod 219. The upper spring seat is provided by the interior surface 266 of the upper end wall of the hollow button 236. The upper end of actuator rod 219 may be slidably received within a cylindrical collar 267 depending from the upper end wall of button 236. A further stop is provided by a flange or wall 268 extending radially inwardly from the lower end of the actuator button 236. Stop 268 engages the undersurface of the flange 264 on actuator rod 219 to limit upward displacement of actuator button 236 relative to the actuator rod.

An annular conductive contact 270 is disposed on the undersurface of the stop flange 268 of actuator button 236 in registry with the two arcuate contacts 256 on actuator 216. Appropriate connective leads (not shown) may be extended from the switch housing 230 to each of the two arcuate contacts 256. The contacts 270 and 256 are normally maintained in axially-spaced relation by the positioning of actuator button 236 relative to actuator rod 219. However, when actuator button 236 is firmly depressed, it overcomes spring 262 and moves downward relative to actuator rod 219 for establishing electrical contact between contact surfaces 256 and 270. Such electrical contact is operative to effectuate selection between front and rear windows which are controlled by actuator motion in the same manner as earlier described. It will be appreciated that contacts 256 might instead be a single circular contact, and the two connective leads would then extend to contacts 210 and 256, respectively.

It will be appreciated that the selection between front and rear window control with switch 210 is a logic function requiring at least some minimal external logic. In other words, the same contact pads 214a–214d on the stationary wafer 212 are used for two different functions, that of front window control both left and right, and that of rear window control, both left and right. If such were construed as a limitation, then yet another embodiment of the invention depicted in FIG. 5 affords an approach for providing discrete contacts to control all four windows with one switch.

Figure 5:
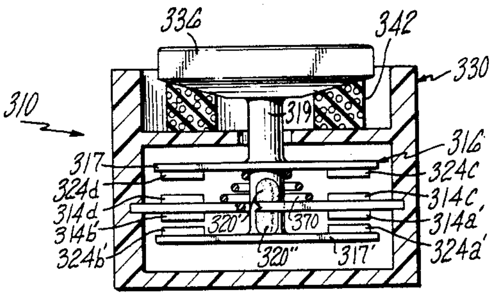
FIG. 5 is a diagrammatic sectional view of another embodiment of the switch in accordance with the invention.

Referring to FIG. 5, the switch 310 is in some respects similar to the switch 110 of FIGS. 2 and 3, however, it has two degrees of freedom in each of two planes. A wafer 312 is mounted in the housing 330 to provide the stationary member of the switch. Contacts 314a–314d are disposed at each of the four corners of the upper surface of wafer 312. Resilient standoff means such as pads 320' extend upwardly from the upper surface of stationary wafer 312 to prevent inadvertent closure of the contacts 314a–314b. The undersurface of the stationary wafer 312 is substantially identical to the upper surface in that it has four contacts 314a'–314d' disposed at respective ones of the four corners and appropriate resilient standoff pads 320'' extending downwardly from the undersurface for a purpose to become hereinafter evident. It does differ, however, in that the relative positions of those contacts 314a'–314d' are diagonally reversed from the contacts 314a–314d on the wafer's upper surface to compensate for the inversion of function which would otherwise occur, as will be seen. The resilient standoff pads 320', 320'' extending upwardly and downwardly from the stationary wafer 312 may be rubber plugs or the like extending through holes in the wafer 312. The movable actuator assembly 316 includes an actuator button 336 similar to that of FIG. 3. A beveled annular resilient pad 342 is positioned between the undersurface of the actuator button 336 and an upper surface of the housing 330. An actuator rod 319 depends from the actuator button 336 and, in the present embodiment, has two "movable" wafers 317 and 317' rigidly mounted thereto in mutually spaced relation. Wafer 317 is disposed above the stationary wafer 312, and wafer 317' is disposed beneath stationary wafer 312.

The arrangement of movable wafer 317 of FIG. 5 is substantially the same as depicted in FIG. 3 and includes underlying contacts 324a–324d. A spring 370 encircles actuator rod 319 and acts in compression against the undersurface of movable wafer 317 and the upper surface of stationary wafer 312 to urge the actuator assembly 316 relatively upward. Contacts 324a'–324d' are positioned on the upper surface of the lower movable wafer 317' for selectable contacting engagement with the contacts 314a'–314d' on the undersurface of the stationary wafer 312. The resilient standoff members 320'' extending downwardly from the undersurface of wafer 312 engage the upper surface of wafer 317' to maintain the contacts in spaced relation prior to actuation and further to urge the entire actuator assembly 316 downwardly into uniformly supported engagement with the resilient ring 342 which underlies button 336.

The axial spacing between wafers 312 and 317 is substantially greater than that between wafer 312 and wafer 317' to ensure that simple tilting of the actuator assembly 316, without axial depression, is not operative to cause engagement between the contacts carried on the upper surface of wafer 312 and the undersurface of wafer 317, but is operative to afford contacting engagement between the contacts on the undersurface of stationary wafer 312 and upper surface of movable wafer 317'. As mentioned earlier, by "reversing" or "inverting" the positions actually the lead connections of contacts 314a'–314d' and 324a'–324d', as by reversing the lead connections, the inversion or reversal of function which would otherwise occur because wafer 317' is on the opposite side of the pivot fulcrum, is avoided. The spring 370 assures that the spacing between wafer 317 and wafer 312 is maintained unless the actuator button 336 is firmly depressed.

Simply tilting the actuator assembly 316 via button 336 causes contact between selected ones of the contacts 314a'–314d' on the undersurface of wafer 312 for controlling one or the other or both of the front windows. However, by both depressing and tilting or pivoting the actuator 316, contact will be made with the selected contacts 314a–314d on the upper surface of stationary wafer 312 to control one, the other, or both of the rear windows.

Figure 6:
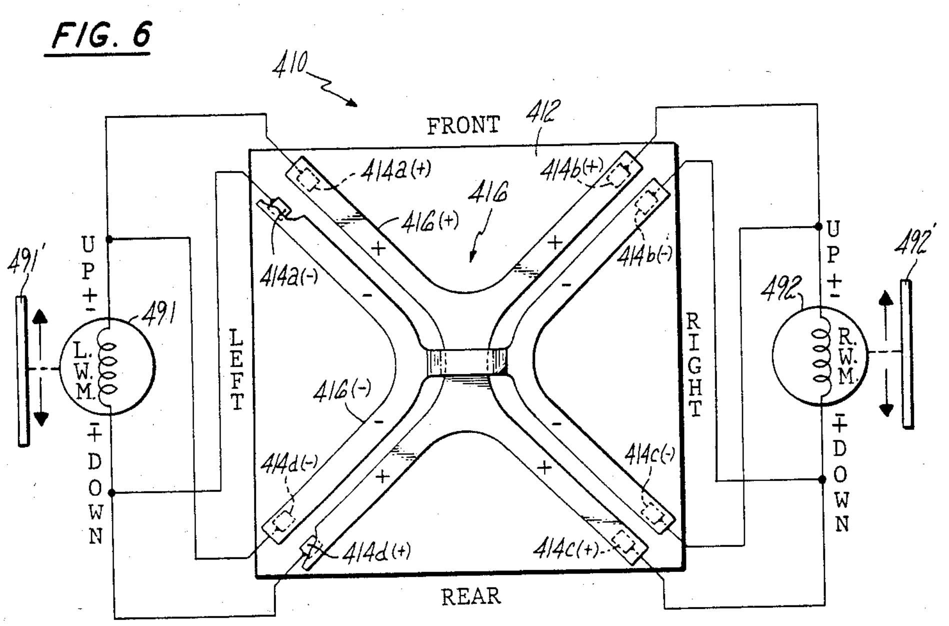
FIG. 6 is a diagrammatic, schematical view of the switch, associated circuitry, and windows in a further embodiment of the invention.

Referring to FIG. 6, there is illustrated in the same highly diagrammatic form as FIG. 1, another embodiment of the switch and further schematically including the appropriate connections with a left window motor 491 and a right window motor 492 which drive left window 491' and right window 492', respectively. The generalized switch is designated 410 and is depicted diagrammatically in plan view as including a stationary substrate or wafer 412 on which are mounted contact-pairs 414*a*(+), 414*a*(−); 414*b*(+), 414*b*(−); 414*c*(+), 414*c*(−); and 414*d*(+), 414*d*(−). Each pair of the above-mentioned contacts having the same reference letter is located in a respective one of the four corners of the wafer 412. Moreover, the two contacts of a respective pair are spaced from one another to prevent inadvertent electrical contact therebetween and to facilitate actuation as will be described.

The actuator assembly 416, is here depicted as comprising a pair of generally X-shaped, conductive contact arms designated 416(+) and 416(−). Contact arm 416(+) is adapted to have a positive potential (i.e., plus twelve volts) connected thereto as by a conductive lead or wiper (not shown) from an appropriate power source. Similarly, contact arm 416(−) is adapted to have a relatively more negative potential (i.e., ground) connected thereto in a similar manner. The distal ends of the respective contact arms 416(+) and 416(−) are preferably in the same plane parallel to the plane of stationary wafer 412 for making simultaneous contact with a respective pair of contacts mounted at a corner of the wafer. On the other hand, it will be appreciated that care must be taken to electrically isolate and insulate contact arm 416(+) from contact arm 416(−). This may be accomplished by insuring that an insulating medium exists between the two arms where they overlap and/or where they extend into proximity with one another. The actuator assembly 416 is analogous to the actuator assembly 116 of FIG. 2 in that it may be pivoted or rocked about a central axis normal to the plane of the drawing so as to bring a distal end of the X-shaped actuator assembly 416 downwardly into contact with the corresponding underlying pair of contacts 414 in the respective corner, much in the same manner as the operation of the switch assembly in FIGS. 2 and 3. It will be presumed that the left window motor 491 and the right window motor 492 may each be reversibly driven simply by reversing the polarity of the voltage thereacross. While this might have been done with separate circuitry in some of the aforementioned embodiments, in the present instance such reversal is effected directly by manipulating actuator assembly 416 into contact with an appropriate one of the contact pairs in a respective corner.

Conductive paths provided by printed circuits, wiring or the like, extend between the various contact pairs and appropriate terminals of the respective motors 491, 492 in the manner depicted in FIG. 6. For instance, with respect to the left window motor 491, one of its terminals is connected to contact 414*a*(+) and also to 414*d*(−). The other pole of the motor is connected to contact 414*d*(+) and to 414*a*(−). The right window motor 492 is connected in a similar manner to the remaining contacts mounted on stationary wafer 412.

Considering the operation of switch 410, if it is desired to drive the left window 491' upward, the actuator assembly 416 is tilted such that its front left distal end moves downwardly into contact with the contact pair 414*a*(−) and 414*a*(+). More specifically, the actuator conductor 416(+) carrying the positive potential moves into engagment with the stationary contact 414*a*(+) and the actuator conductor 416(−) carrying the relatively negative potential moves into engagement with the stationary contact 414*a*(−). Such arrangement applies a potential across motor 491 which drives it in the "up" direction. On the other hand, if the left rear end of actuator 416 is pivoted downwardly into contact with contacts 414*d*(+) and 414*d*(−), the relative polarity will be reversed, thereby causing motor 491 to move the window 491' in the downward direction. The right window motor 492 operates in a similar manner to control right window 492'.

As described earlier with respect to the other embodiments, if it is deemed desirable to construct the switch 410 such that there is no need to extend electrical potentials to the moving actuator assembly 416, it would be possible to construct that assembly such that it only serves an actuating function without being required to be electrically conductive. This could be accomplished by constructing each contact pad, i.e., 414*a*(+), as a pair of contacts, with each being mounted on the stationary wafer 412 such that one contact of that pair is stationary and the other is relatively movable into engagement therewith upon actuating engagement by the actuator 416. In that way, all of the appropriate potentials to be supplied to the respective contacts may be carried via conductive leads mounted on or deposited on the stationary wafer 412.

The invention has been described with reference to a particular embodiment but it will be understood by those skilled in the art that variations and modifications can be effected within the spriit and scope of the invention.

What is claimed is:

1. In a multidimensional spatial reference system having "left" and "right" electrically-operated windows, the "left" window being positioned relatively leftward of the "right" window, each window including a respective reversible electric drive motor for driving the window "up" and "down", and a control switch having four normally-open electrical contact pairs and an actuator, each contact pair being individually and selectably actuatable to a closed condition for electrical conduction and being angularly spaced form one another at four respective different locations relative to the actuator, the actuator being displaceable from a neutral position for selectively actuating respective ones of said contact pairs, the method comprising:

positioning said control switch and associated contact pairs in said spatial reference system such that said actuator actuates a respective different one of said contact pairs when actuated from the neutral position to each of a respective one of a "left front", a "right front", a "left rear", and a "right rear" position, respectively leftward and forward, rightward and forward, leftward and rearward, and rightward and rearward relative to the neutral position; and connecting electrical circuit means with said respective contact pairs and said window drive motors such that manipulation of said actuator means to said "left front" position causes said "left" window to go "up", to said "left rear" position causes said left window to go "down", to said "right front" position causes said "right" window to go "up", and to said "right rear" position causes said "right window" to go "down".

2. A method according to claim 1 further comprising: providing said switch actuator to be further manipulable to respective ones of a "front" and a "rear" position, respectively forward and rearward relative to the neutral position; and connecting said circuit means for causing both the "left" and "right" windows to go "up" when the actuator is moved directly to the "front" position and for causing both the "left" and "rigth" windows to go "down" when the actuator is moved directly to the "rear" position.

3. A method according to claim 2 for operating four electric windows, respective said "left" and "right" electric windows being in each of respective "front" and "back" locations, the switch further including a fifth pair of contacts and further comprising:

providing said switch actuator to also be concurrently manipulable to a "depressed" position from a "non-depressed" position in a direction mutually perpendicular to said "left front", "right front", "left rear", and "right rear" positions for actuating said fifth pair of contacts; and connecting said circuit means for causing said "left" and said "right" windows in opposite ones of said "front" and said "back" locations to respond when the actuator is moved while in opposite ones of said "depressed" and "non-depressed" positions.

4. A method according to claim 3 wherein the actuator is moved from said neutral position to each of the other said positions by manually tilting the actuator.

5. A method according to claim 1 for operating four electric windows, respective said "left" and "right" electric windows being in each of respective "front" and "back" locations, the switch further including a fifth pair of contacts and further comprising:

providing said switch actuator to also be concurrently manipulable to a "depressed" position from a "non-depressed" position in a direction mutually perpendicular to said "left front", "right front", "left rear", and "right rear" positions for actuating said fifth pair of contacts; and connecting said circuit means for causing said "left" and said "right" windows in opposite ones of said "front" and said "back" locations to respond when the actuator is moved while in opposite ones of said "depressed" and "non-depressed" positions.

6. A method according to claim 1 wherein the actuator is moved from said neutral position to each of the other said positions by manually tilting the actuator.

7. A switch arrangement for a vehicle for operating a "left" and a "right" electrically-operated window in the vehicle, the "left" window being relatively leftward of the "right" window, in a spatial reference system in the vehicle, each said window including a respective reversible electric drive motor for driving the window "up" and "down" and wherein the switch arrangement comprises;

a switch housing mounted in a particular orientation in the vehicle;

four normally-open electrical contact pairs, each being individually and selectably actuatable to a closed condition for eletrical conduction and being fixedly located within said switch housing at a respective different one of four locations;

actuator means movable mounted in said switch housing for manipulation from a neutral position to respective ones of a "left front", "right front", a "left rear", and a "right rear" position in said vehicle spatial reference system when said switch housing is mounted therein in said particular orientation, a respective one of said four contact pairs being closed by manipulation of said actuator means to each of said "left front", "right front", "left rear" and "right rear" positions; and electrical circuit means for connecting said contact pairs with said window drive motors such that manipulation of said actuator means to said "left front" position and said "left rear" position causes said "left" window to go "up" and "down", respectively, and manipulation to said "right front" position and said "right rear" position causes said "right" window to go "up" and "down", respectively.

8. The switch arrangement of claim 7 wherein said actuator means is mounted for further manipulation to a "front" and to a "rear" position in said vehicle spatial reference system, said "left front": and "right front" contact pairs being closed concurrently by manipulation of said actuator means to said "front" position and said "left rear" and "right rear" contact pairs begin closed concurrently by manipulation of said actuator means to said "rear" position.

9. The switch arrangement of claim 8 for operating four electric windows, said "left" and said "right" windows being in each of respective "front" and "back" locations of the vehicle, each said window including a respective reversible electric drive motor for driving the window "up" and "down", said arrangement further comprising:

said actuator means also being concurrently manipulable to a "depressed" position from a "non-depressed" position in a direction mutually perpendicular to said "front", "rear", "left front", "right front", "left rear", and "right rear" positions;

a fifth normally-open electrical contact pair located in the switch housing at a respective fifth position, said fifth contact pair being actuated closed by manipulation of said actuator means to said "depressed" positign; and wherein said electrical circuit means connects said contact pairs with said window drive motors such that "left" and "right" windows in opposite ones of said "front" and said "back" locations respond when said actuator means is moved while in opposite ones of said "depressed" and "non-depressed" positions.

10. The switch arrangement of claim 8 wherein one contact of each of said four contact pairs is fixedly positioned in said switch housing, and the remaining contact of each said pair is mounted on said actuator means for displacement therewith relative to the housing.

11. The switch arrangement of claim 8 wherein said four contact pairs are orthogonally arrayed and further including stop means mounted within said housing, said stop means being structured and positioned to prevent motion of said actuator means to either of two restricted positions which would result in the concurrent closing of said "left front" and "left rear" contact pairs and the concurrent closing of "right front" and "right rear" contact pairs respectively.

12. The switch arrangement of claim 8 wherein said actuating means is mounted for manual pivotal displacement from said neutral position to each of the other said positions.

* * * * *